United States Patent
Hwang et al.

(10) Patent No.: US 9,288,727 B2
(45) Date of Patent: Mar. 15, 2016

(54) METHOD AND APPARATUS FOR SUPPORTING DEVICE-TO-DEVICE COMMUNICATIONS

(71) Applicant: Samsung Electronics Co. Ltd., Suwon-si, Gyeonggi-do (KR)

(72) Inventors: Pil-Yong Hwang, Gimpo-si (KR); Ok-Seon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 13/767,480

(22) Filed: Feb. 14, 2013

(65) Prior Publication Data

US 2013/0208697 A1    Aug. 15, 2013

(30) Foreign Application Priority Data

Feb. 15, 2012    (KR) .......................... 10-2012-0015221

(51) Int. Cl.
*H04W 36/08*    (2009.01)
*H04W 8/26*    (2009.01)
*H04W 76/02*    (2009.01)

(52) U.S. Cl.
CPC ............... *H04W 36/08* (2013.01); *H04W 8/26* (2013.01); *H04W 76/023* (2013.01)

(58) Field of Classification Search
None
See application file for complete search history.

(56) References Cited

U.S. PATENT DOCUMENTS

| 2007/0091822 A1 | 4/2007 | Do et al. | |
| 2009/0016232 A1* | 1/2009 | Kwon et al. | 370/252 |
| 2010/0110929 A1* | 5/2010 | Li et al. | 370/254 |
| 2010/0260142 A1 | 10/2010 | Jung et al. | |
| 2011/0098043 A1* | 4/2011 | Yu et al. | 455/435.1 |
| 2011/0317569 A1 | 12/2011 | Kneckt et al. | |
| 2012/0134344 A1* | 5/2012 | Yu et al. | 370/336 |
| 2012/0140733 A1 | 6/2012 | Jung et al. | |
| 2013/0040680 A1 | 2/2013 | Kim et al. | |
| 2013/0102314 A1* | 4/2013 | Koskela et al. | 455/436 |
| 2014/0004857 A1* | 1/2014 | Rune et al. | 455/434 |
| 2014/0169259 A1* | 6/2014 | Lee et al. | 370/312 |

(Continued)

FOREIGN PATENT DOCUMENTS

| WO | 2010/095880 A2 | 8/2010 |
| WO | 2010/095880 A3 | 8/2010 |

(Continued)

OTHER PUBLICATIONS

Srinivasan, IEEE 802.16m System Description Document (SDD), IEEE 802.16m-09/0034r4, Dec. 21, 2010, pp. 1-170, vol. 802.16m, No. r4, XP068003265, IEEE, Piscataway NJ.

*Primary Examiner* — Redentor Pasia
(74) *Attorney, Agent, or Firm* — Jefferson IP Law, LLP

(57) ABSTRACT

A method for supporting Device-to-Device (D2D) communications by a Mobile Station (MS) in a communication system is provided. The method includes performing a network entry procedure with a Base Station (BS) and receiving, from the BS, a BS prefix, a temporary Identifier (ID), and a valid period timer value for the temporary ID, generating a device ID using the BS prefix and the temporary ID, and performing, upon detecting data to be transmitted, communication with a peer MS using the device ID for a time indicated by the valid period timer value. The BS prefix is information unique within the communication system, and the temporary ID is information unique within a coverage area of the BS.

16 Claims, 5 Drawing Sheets

(56) References Cited

U.S. PATENT DOCUMENTS

2014/0286284 A1* 9/2014 Lim et al. .................. 370/329
2014/0314057 A1* 10/2014 Van Phan et al. ........... 370/336
2014/0355483 A1* 12/2014 Jang et al. .................. 370/254

FOREIGN PATENT DOCUMENTS

| WO | 2011/109027 A1 | 9/2011 |
| WO | 2011/136620 A2 | 11/2011 |
| WO | 2011/136620 A3 | 11/2011 |

* cited by examiner

METHOD AND APPARATUS FOR SUPPORTING DEVICE-TO-DEVICE COMMUNICATIONS

PRIORITY

This application claims the benefit under 35 U.S.C. §119(a) of a Korean patent application filed on Feb. 15, 2012 in the Korean Intellectual Property Office and assigned Serial No. 10-2012-0015221, the entire disclosure of which is hereby incorporated by reference.

BACKGROUND OF THE INVENTION

1. Field of the Invention

The present invention relates to Device-to-Device (D2D) communications. More particularly, the present invention relates to a method and an apparatus for supporting D2D communications that use device Identifiers (IDs).

2. Description of the Related Art

With advances in communication devices and communication systems, users of the communication devices require the services in which they can easily obtain their desired information at any time, or share the information with users of other devices or Mobile Stations (MSs). Recently, with the advent of smart devices, such as smart phones and tablet Personal Computers (PCs), an advanced environment has been established, in which users may obtain and share a wide variety of information through wireless communications.

However, in the case of wireless communication systems, users cannot obtain and share the desired information unless a communications infrastructure is built. In addition, it is not easy for the wireless communication systems to efficiently provide the real-time information which may be minor but useful in everyday life, due to the system complexity or time delay.

Accordingly, a D2D service has been emerged, which may take place through communication links between MSs without network entities, such as a Base Station (BS), in locations where no communications infrastructure is built.

In a cellular communication system, an MS performs communication using a temporary ID that is unique only in its BS and can be changed. For the temporary ID, its global uniqueness within the system is not guaranteed, but its security may be ensured. The term 'temporary ID' as used herein may refer to an ID that is assigned to an MS in order to access the BS.

On the other hand, an MS performing the D2D service performs communications using a Media Access Control (MAC) address. For the MAC address, its global uniqueness within the system may be guaranteed, but its security is vulnerable, so the location and other information of the MS may be exposed.

Therefore, there is a need for a way to perform communication using the IDs, whose global uniqueness within the system is guaranteed and whose security may be ensured like in the cellular communication system, in D2D communications.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method and an apparatus for supporting Device-to-Device (D2D) communications that use device Identifiers (IDs), in a communication system.

Another aspect of the present invention is to provide a method and an apparatus for supporting D2D communications that use device IDs, which can guarantee both their global uniqueness within the system and security.

In accordance with one aspect of the present invention, a method for supporting D2D communications by a Mobile Station (MS) in a communication system is provided. The method includes performing a network entry procedure with a Base Station (BS) and receiving, from the BS, a BS prefix, a temporary ID, and a valid period timer value for the temporary IDBS, generating a device ID using the BS prefix and the temporary ID, and performing, upon detecting data to be transmitted, communication with a peer MS using the device ID for a time indicated by the valid period timer value. The BS prefix may be information unique within the communication system, and the temporary ID may be information unique within a coverage area of the BS.

In accordance with another aspect of the present invention, a method for supporting D2D communications by a BS in a communication system is provided. The method includes performing a network entry procedure with an MS and transmitting, to the MS, a BS prefix, a temporary ID, and a valid period timer value for the temporary ID, upon detecting disconnection of a communication link to the MS, starting operation of a timer which is set depending on the valid period timer value, deleting, upon expiration of the timer, the temporary ID from a list in which the BS records temporary IDs assigned to the MS. The BS prefix may be information unique within the communication system, and the temporary ID may be information unique within a coverage area of the BS.

In accordance with another aspect of the present invention, a method for supporting D2D communications by a BS in a communication system is provided. The method includes receiving, from an MS, a device ID including a serving BS's prefix and a serving BS's temporary ID, transmitting, to the MS, a target BS's prefix, a target BS's temporary ID, and a valid period timer value for the target BS's temporary ID, and returning the serving BS's temporary ID to the serving BS which is detected from the serving BS's prefix. The serving BS's prefix and the target BS's prefix may be information unique within the communication system, the serving BS's temporary ID may be information unique within a coverage area of the serving BS, and the target BS's temporary ID may be information unique within a coverage area of the target BS.

In accordance with yet another aspect of the present invention, an MS apparatus for supporting D2D communications in a communication system is provided. The MS apparatus includes a receiver for performing a network entry procedure with a BS and for receiving, from the BS, a BS prefix, a temporary ID, and a valid period timer value for the temporary ID, a generator for generating a device ID using the BS prefix and the temporary ID, a detector for detecting data to be transmitted, and a transmitter for performing communication with a peer MS using the device ID for a time indicated by the valid period timer value, if the detector detects data to be transmitted. The BS prefix may be information unique within the communication system, and the temporary ID may be information unique within a coverage area of the BS.

In accordance with still another aspect of the present invention, a BS apparatus for supporting D2D communications in a communication system is provided. The BS apparatus includes a transmitter for performing a network entry procedure with an MS and for transmitting, to the MS, a BS prefix, a temporary ID, and a valid period timer value for the temporary ID, a detector for detecting disconnection of a communication link to the MS, a timer for setting a timer value depending on the valid period timer value, and for starting operation thereof if the detector detects the disconnection of a communication link to the MS, and a list manager for deleting, upon expiration of the timer, the temporary ID from a list in which the BS records temporary IDs assigned to the MS. The BS prefix may be information unique within the communication system, and the temporary ID may be information unique within a coverage area of the BS.

In accordance with still another aspect of the present invention, a BS apparatus for supporting D2D communications in a communication system is provided. The BS apparatus includes a receiver for receiving, from an MS, a device ID including a serving BS's prefix and a serving BS's temporary ID, and a transmitter for transmitting, to the MS, a target BS's prefix, a target BS's temporary ID, and a valid period timer value for the target BS's temporary ID, and for returning the serving BS's temporary ID to the serving BS which is detected from the serving BS's prefix. The serving BS's prefix and the target BS's prefix may be information unique within the communication system, the serving BS's temporary ID may be information unique within a coverage area of the serving BS, and the target BS's temporary ID may be information unique within a coverage area of the target BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention relate to a method and an apparatus for supporting Device-to-Device (D2D) communications that use device Identifiers (IDs).

Figure 1:
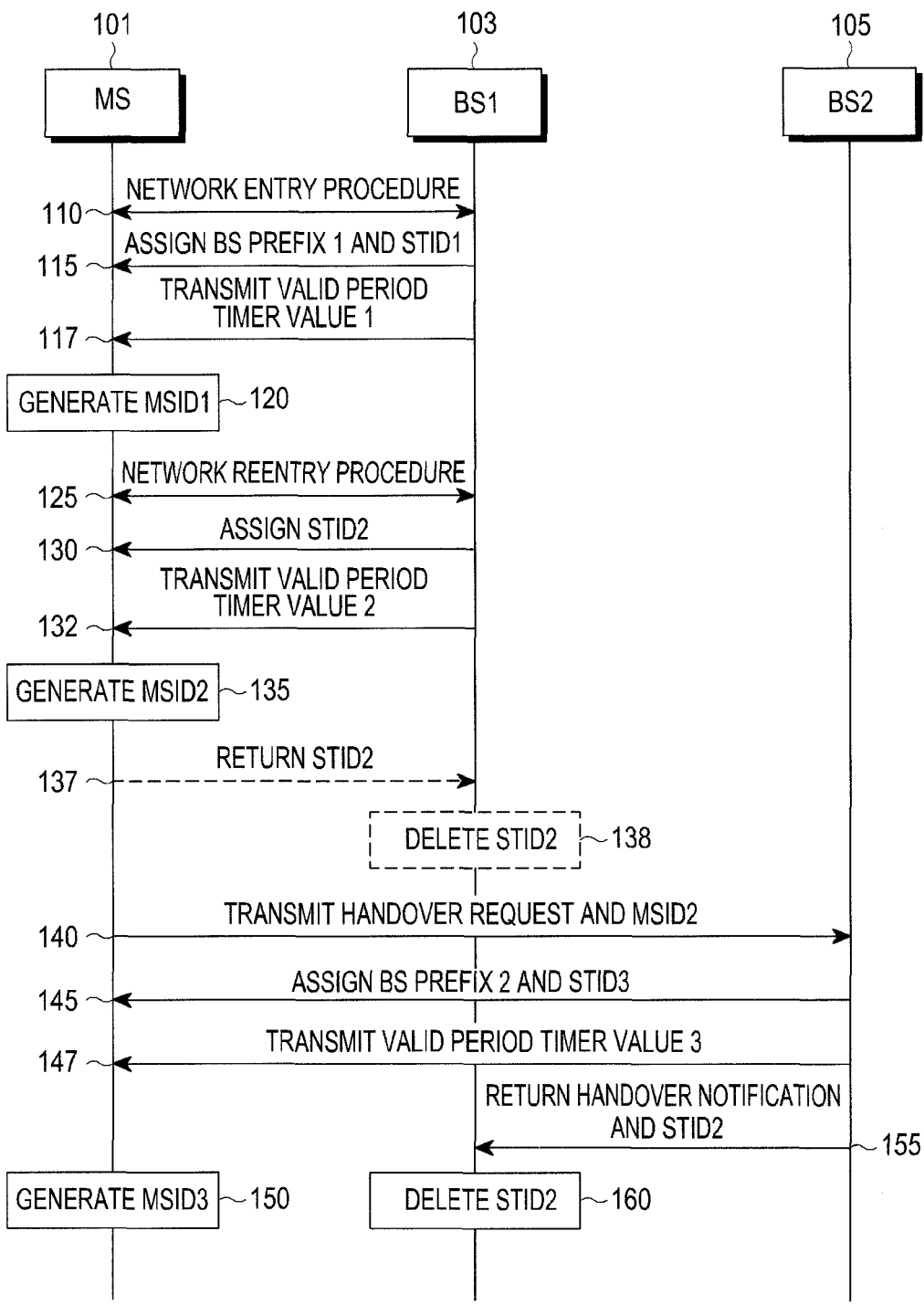
FIG. 1 illustrates a Device-to-Device (D2D) communication procedure that uses device Identifiers (IDs), according to an exemplary embodiment of the present invention.

FIG. 1 illustrates a D2D communication procedure that uses device IDs, according to an exemplary embodiment of the present invention.

Referring to FIG. 1, a Mobile Station (MS) 101 accesses its neighbor Base Station (BS), for example, a first BS (BS1) 103, and performs a network entry procedure with the BS1 103 in step 110. Thereafter, the BS1 103 assigns a first BS prefix and a first temporary ID to the MS 101 in step 115. The temporary ID, which is assigned to ensure its security, may refer to an ID which is unique only within the coverage area of the BS, with which the MS has completed the network entry procedure, and which can be changed at any time. The temporary ID will be referred to herein as a Station ID (STID), and the first STID that the MS 101 is assigned from the BS1 103, is valid only in the coverage area of the BS1 103.

A BS prefix is assigned to ensure the global uniqueness within the system, and may be comprised of the following values.

BS Prefix=(Operator ID+BS ID), or (Nation ID+Operator ID+BS ID), or (Type+Operator ID+BS ID), or (Type+Nation ID+Operator ID+BS ID).

The operator ID is unique information of each operator, and this information is distinguishable for each system. The BS ID is for identifying a BS within the system indicated by the operator ID, and that is the information which is unique only within the system. The nation ID is information that is unique only in the nation or state, and the type is information indicating the system type.

As such, the BS prefix may be configured in a variety of ways by a combination of the above-described IDs, and the BS prefix is configured to include the operator ID to ensure the global uniqueness within the system. The above information constituting the BS prefix may be included in cell information, or may be transmitted from a BS to an MS by being comprised of separate information.

In addition to assigning the first BS prefix and the first STID to the MS 101 in step 115, the BS1 103 transmits a first valid period timer value of the first STID to the MS 101 in step 117. The MS 101 generates a first device ID using the first BS prefix and the first STID that it has been assigned from the BS1 103, in step 120. Although not illustrated, the MS 101 may perform communication, for a time indicated by the first valid period timer value using the generated first device ID during its further communication, with the peer MS (not shown) it wants to communicate with. For example, if it is assumed that the first BS prefix is comprised of N bits and the first STID is comprised of M bits, the first device ID is comprised of M+N bits.

The time indicated by the valid period timer refers to the time for which the MS 101 can communicate with the peer MS using the first device ID. The device ID will be referred to herein as an MSID. The MSID is generated by a sum of a BS prefix assigned to ensure the global uniqueness within the system and an STID assigned to ensure the security. Therefore, the MSID may guarantee both of the global uniqueness within the system and the security.

The first valid period timer does not operate while the MS 101 is connected to the BS1 103, and operation of the first valid period timer is started beginning at the time the MS 101 starts its communication with the peer MS after disconnecting the communication link to the BS1 103. The first valid period timer value is a value that each of the MS 101 and the BS1 103 needs to maintain. The MS 101 starts operation of the first valid period timer at the time its communication with the peer MS starts, and the BS1 103 starts operation of the first valid period timer at the time its communication link to the MS 101 is disconnected. If the first valid period timer has expired, the MS 101 terminates its communication with the peer MS and the BS1 103 deletes the first STID from a list in which it records assigned STIDs. If the MS 101 re-accesses the BS1 103 through the network reentry procedure before the first valid period timer expires, the first valid period timer's value is initialized.

It will be assumed herein that the MS 101 re-accesses the BS1 103 before the first valid period timer expires.

In step 125, the MS 101 performs the network reentry procedure with the BS1 103 and the first valid period timer value is initialized. The BS1 103 assigns a second STID generated by the network reentry to the MS 101 in step 130, and transmits a second valid period timer value of the second STID to the MS 101 in step 132. The BS prefix information is not newly assigned, since it is the same as the information assigned in step 115.

In step 135, the MS 101 generates a second MSID using the first BS prefix and the second STID. Although not illustrated, the MS 101 may perform communication for a time indicated by the second valid period timer value using the generated second MSID during its further communication with the peer MS.

In step 140, upon request for handover from the BS1 103 to another neighbor BS, for example, a second BS (BS2) 105, the MS 101 sends a handover request message to the BS2 105. The MS 101 transmits the second MSID information along with the handover request message.

The BS2 105 assigns a second BS prefix and a third STID to the MS 101 in step 145, and transmits a third valid period timer value of the third STID in step 147. In step 150, the MS 101 generates a third MSID using the second BS prefix and the third STID it has been assigned from the BS2 105. Although not illustrated, the MS 101 may perform communication for a time indicated by the third valid period timer value using the generated third MSID during its further communication with the peer MS.

In step 155, the BS2 105 obtains the first BS prefix and the second STID information from the second MSID received in step 140, and sends a handover notification message to the BS1 103, which is detected based on the first BS prefix information. The BS2 105 returns the second STID to the BS1 103. In step 160, the BS1 103 deletes the returned second STID from the list in which it records assigned STIDs.

Although it is assumed in FIG. 1 that the BS2 105 returns the second STID to the BS1 103 after the MS 101 performs handover to the BS2 105, the second STID may be returned before the MS 101 performs handover to the BS2 105. More specifically, upon request for handover to the BS2 105, the MS 101 may return the second STID to the BS1 103 in step 137 before handling handover request to the BS2 105 in step 140, and the BS1 103 may delete the returned second STID from the list in which it records assigned STIDs, in step 138. In this case, the MS 101 does not need to transmit the second MSID information upon request for handover.

Figure 2:
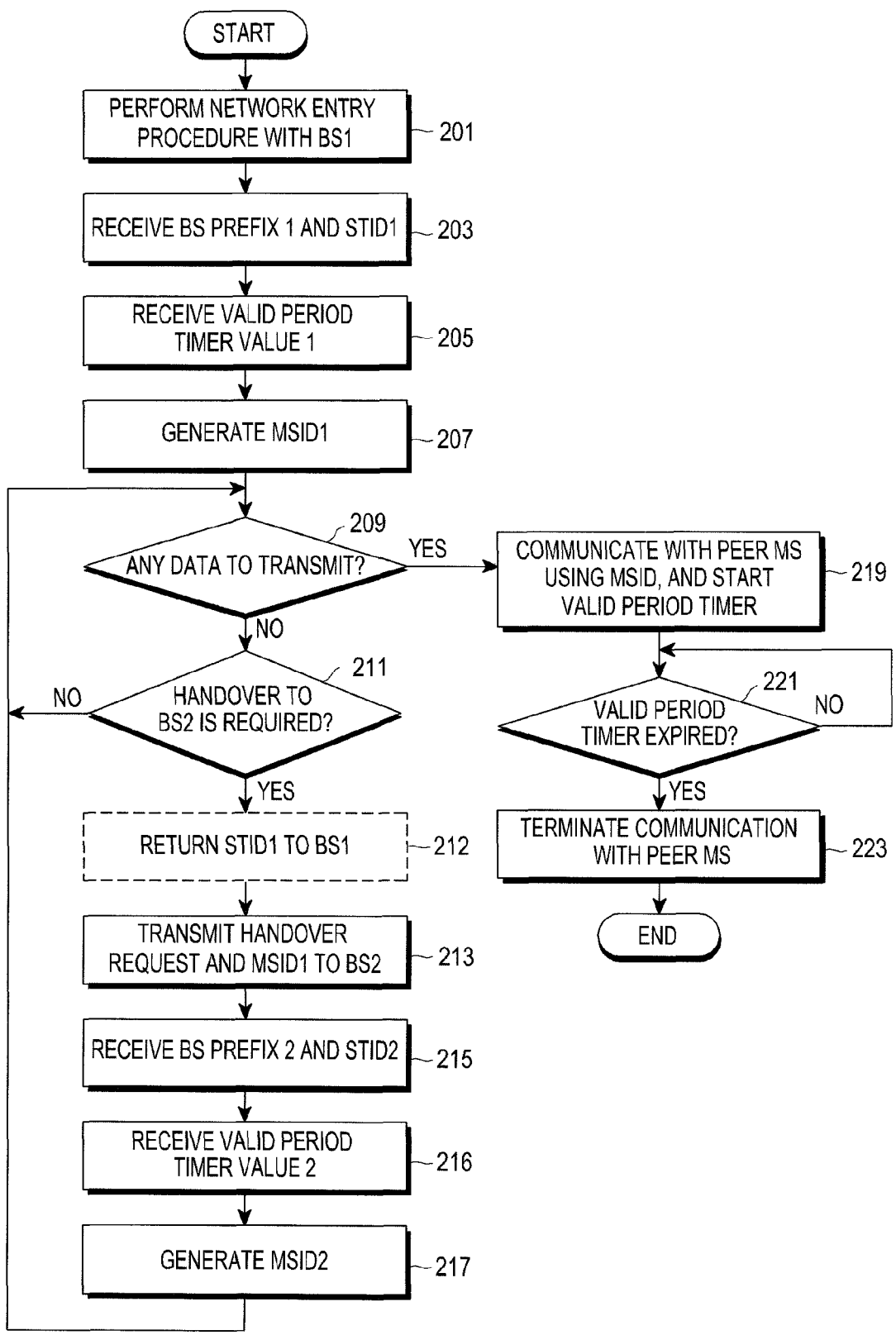
FIG. 2 is a flowchart illustrating a Mobile Station's (MS's) operation of performing D2D communications that use device IDs, according to an exemplary embodiment of the present invention.

FIG. 2 is a flowchart illustrating an MS's operation of performing D2D communications that use device IDs, according to an exemplary embodiment of the present invention.

Referring to FIG. 2, in step 201, the MS accesses its neighbor BS, for example, a BS1, and performs the network entry procedure with the BS1.

The MS is assigned a first BS prefix and a first STID from the BS1, in step 203, and receives a first valid period timer value transmitted from the BS1, in step 205.

Thereafter, in step 207, the MS generates a first MSID using the first BS prefix and the first STID that it has been assigned in step 203. The first BS prefix is information assigned to ensure the global uniqueness within the system, and the first STID is information assigned to ensure the security. The first valid period timer value refers to the time for which the MS can communicate with the peer MS using the first MSID it has generated in step 207. The first MSID, which is generated using the first BS prefix and the first STID, may guarantee both the global uniqueness within the system and the security.

In step 209, the MS determines whether there is any data to be transmitted. If there is data to be transmitted, the MS starts, in step 219, its communication with the peer MS using the first MSID it has generated in step 207. When starting its communication with the peer MS, the MS starts operation of the first valid period timer that operates depending on the first valid period timer value it has received in step 205.

Thereafter, in step 221, the MS determines whether the first valid period timer has expired, the operation of which was started in step 219. Step 221 is repeatedly performed until the first valid period timer expires, and upon expiration of the first valid period timer, the MS terminates its communication with the peer MS in step 223.

On the other hand, if it is determined in step 209 that there is no data to be transmitted, the MS determines in step 211 whether handover to another neighbor BS, for example, a BS2, is required. If the handover to the BS2 is not required, the MS returns to step 209 to determine again whether there is any data to be transmitted. However, if the handover to the BS2 is required, the MS requests handover by sending a handover request message to the BS2 and at the same time, transmits the first MSID information it generated in step 207, in step 213.

Thereafter, the MS is assigned a second BS prefix and a second STID from the BS2, in step 215, and receives a second valid period timer value transmitted from the BS2 in step 216. Thereafter, in step 217, the MS generates a second MSID using the second BS prefix and the second STID it has been assigned in step 215, and returns to step 209.

In step 209, the MS determines whether there is any data to be transmitted. If there is data to be transmitted, the MS starts, in step 219, its communication with the peer MS using the second MSID it has generated in step 217. When starting the communication with the peer MS, the MS starts operation of the second valid period timer that operates depending on the second valid period timer value it received in step 216.

Thereafter, in step 221, the MS determines whether the second valid period timer has expired, the operation of which was started in step 219. If the second valid period timer has expired, the MS terminates its communication with the peer MS in step 223.

It will be assumed in FIG. 2 that the BS2 returns the assigned first STID to the BS1 after the MS performs handover. However, in some cases, the assigned first STID may be returned before the MS performs handover. In this case, the assigned first STID is returned to the BS1 from the MS.

Therefore, if the assigned first STID is returned from the MS to the BS1 in this way, step 212 may be performed between steps 211 and 213. More specifically, if the handover to the BS2 is required in step 211, the MS returns the assigned first STID to the BS1 in step 212. In step 213, the MS requests handover by sending a handover request message to the BS2. In this case, the MS does not need to transmit the first MSID information, upon request for handover.

Although not illustrated, the MS may perform the network reentry procedure with the BS1 before performing handover. More specifically, the MS may access the BS1 while performing the communication with the peer MS. In this case, a value of the first valid period timer is initialized, that counts the MS's communication time with the peer MS. In addition, the MS is assigned a new STID from the BS1, and receives a valid period timer value for the new STID together with the new STID.

If there is any data to be transmitted, the MS performs communication with the peer MS with a new MSID that is generated using the assigned first BS prefix and the new STID. The time for which the MS performs the communication may be determined depending on the time indicated by the valid period timer value for the new STID.

Figure 3:
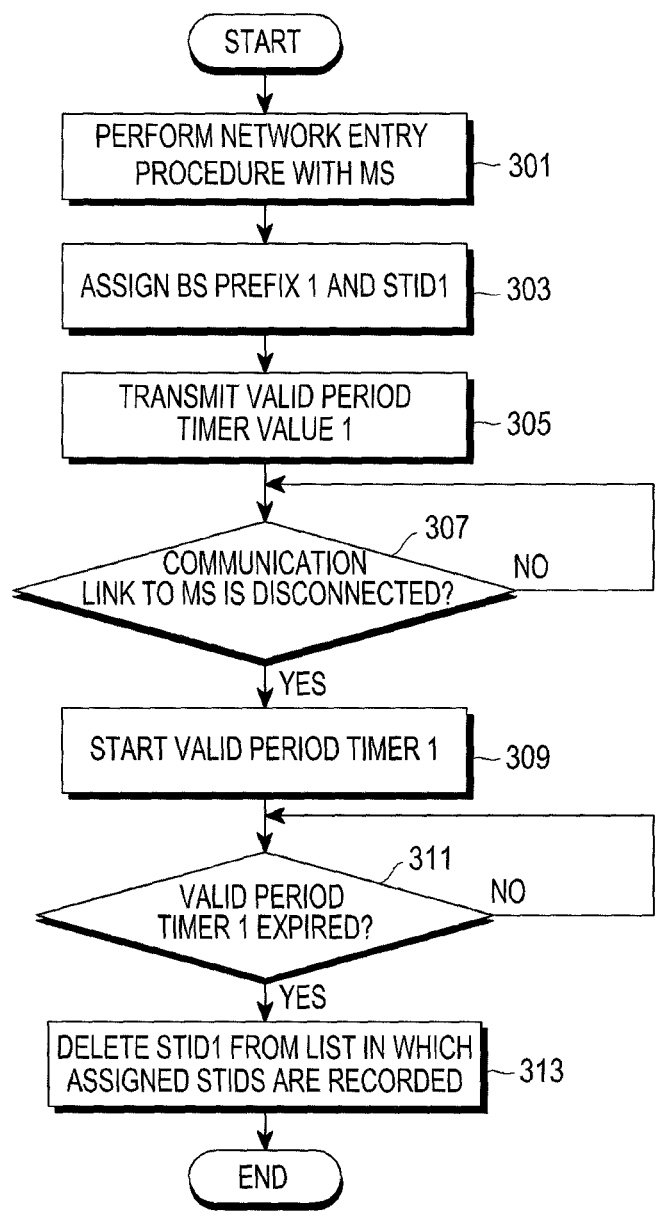
FIG. 3 is a flowchart illustrating a Base Station 1's (BS1's) operation of supporting D2D communications that use device IDs, according to an exemplary embodiment of the present invention.

FIG. 3 is a flowchart illustrating a BS1's operation of supporting D2D communications that use device IDs, according to an exemplary embodiment of the present invention.

Referring to FIG. 3, the BS1 performs the network entry procedure with the MS that has accessed to the BS1 itself, in step 301.

The BS1 assigns its BS prefix and STID, i.e., a first BS prefix and a first STID, to the MS, in step 303, and transmits a first valid period timer value for the first STID to the MS in step 305.

Thereafter, in step 307, the BS1 determines whether its communication link to the MS is disconnected. The expression 'the communication link between the BS1 and the MS is disconnected' means that the MS begins its communication with the peer MS. Step 307 is repeatedly performed until the BS1's communication link to the MS is disconnected. Upon detecting the disconnection of its communication link to the MS, the BS1 starts operation of the first valid period timer that operates depending on the first valid period timer value, in step 309.

Thereafter, in step 311, the BS1 determines whether the first valid period timer has expired, operation of which was started in step 309. Step 311 is repeatedly performed until the first valid period timer expires, and upon expiration of the first valid period timer, the BS1 deletes, in step 313, the first STID which was assigned in step 303, from the list in which it records assigned STIDs.

It is assumed in FIG. 3 that upon the expiration of the valid period timer, the STID is deleted. However, the operation of deleting a specific STID from the list, in which assigned STIDs are recorded, may be performed even when the STID is returned from the MS or other BSs except for the BS1.

Figure 4:
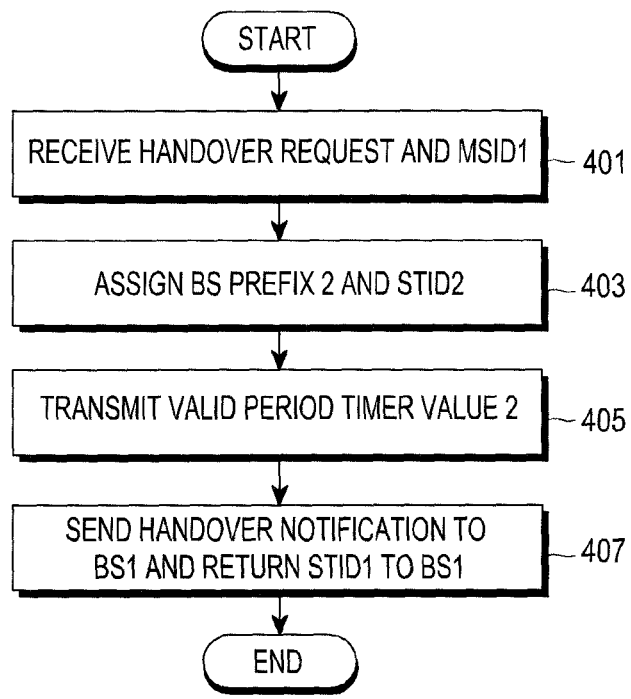
FIG. 4 is a flowchart illustrating a BS2's operation of supporting D2D communications that use device IDs, according to an exemplary embodiment of the present invention.

FIG. 4 is a flowchart illustrating a BS2's operation of supporting D2D communications that use device IDs, according to an exemplary embodiment of the present invention.

Referring to FIG. 4, in step 401, the target BS, for example, the BS2, to which the MS will perform handover, receives a handover request and first MSID information from the MS. The first MSID refers to an MSID of the current serving BS, for example, the BS1 of the MS.

The BS2 assigns its BS prefix and STID, i.e., a second BS prefix and a second STID, to the MS in step 403, and transmits a second valid period timer value for the second STID in step 405. The second valid period timer value refers to the time for which the MS can communicate with the peer MS with the second MSID that is generated using the second BS prefix and the second STID.

Thereafter, in step 407, the BS2 returns the first STID to the BS, for example, the BS1, which is detected based on the first BS prefix information which is acquired from the first MSID that the BS2 received in step 401.

It is assumed in FIG. 4 that the BS2 returns the assigned first STID to the BS1 after the MS performs handover to the BS2. However, in some cases, the assigned first STID may be returned before the MS performs handover. In this case, the assigned first STID is returned to the BS1 from the MS. Therefore, if the assigned first STID is returned from the MS to the BS1 in this way, the operation of receiving the first MSID information by the BS2 in step 401, and the operation of returning the first STID by the BS2 in step 407 may be omitted.

Figure 5:
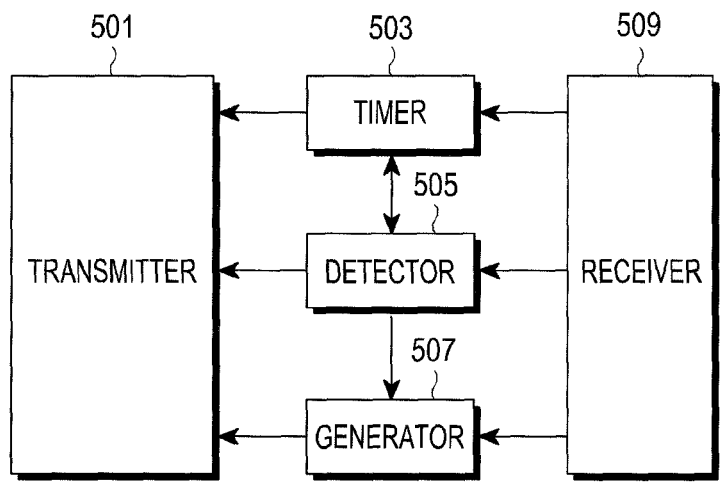
FIG. 5 illustrates a block diagram of an MS performing D2D communications that use device IDs, according to an exemplary embodiment of the present invention.

FIG. 5 illustrates a block diagram of an MS performing D2D communications that use device IDs, according to an exemplary embodiment of the present invention.

Referring to FIG. 5, a transmitter 501 and a receiver 509 of the MS perform the network entry procedure with a neighbor BS, and the receiver 509 receives a BS prefix, an STID and a valid period timer value for the STID from the neighbor BS (or a serving BS).

A generator 507 generates an MSID using the BS prefix and STID received from the receiver 509. The BS prefix is information assigned to ensure the global uniqueness within the system, and the STID is information assigned to secure the security. The valid period timer value refers to the time for which the MS can communicate with the peer MS using the generated MSID. The MSID, which is generated using the BS prefix and the STID, may guarantee both the global uniqueness within the system and the security.

A detector 505 determines whether there is any data to be transmitted. If the detector 505 detects data to be transmitted, the transmitter 501 transmits the detected data using the MSID generated by the generator 507. As the same time, a timer 503 starts its operation. The timer 503 is set depending on the valid period timer value for the STID. If the timer 503 expires, the transmitter 501 terminates its data transmission.

If the detector 505 detects a handover from the current serving BS to another neighbor BS (or a target BS), the transmitter 501 returns the STID of the serving BS to the serving BS, and sends a handover request to the target BS.

The receiver 509 receives a new BS prefix, a new STID and a valid period timer value for the new STID from the target BS.

When not returning the STID of the serving BS to the serving BS, the transmitter 501 transmits the MSID of the serving BS to the target BS along with the handover request.

Figure 6:
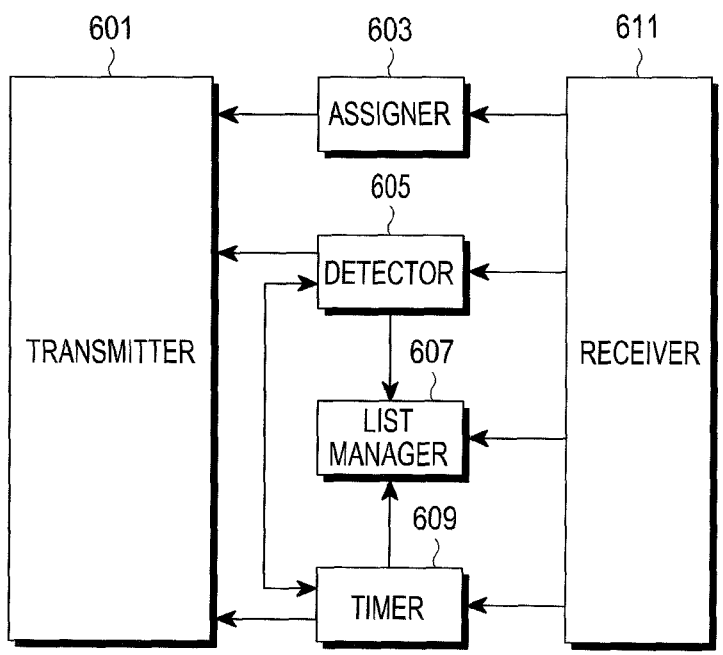
FIG. 6 illustrates a block diagram of a BS supporting D2D communications that use device IDs, according to an exemplary embodiment of the present invention.

FIG. 6 illustrates a block diagram of a BS supporting D2D communications that use device IDs, according to an exemplary embodiment of the present invention.

Referring to FIG. 6, a transmitter 601 and a receiver 611 of the BS perform the network entry procedure with an MS. An assigner 603 assigns a BS prefix and an STID to the MS, and the transmitter 601 transmits a valid period timer value for the STID.

A detector 605 determines whether the BS's communication link to the MS is disconnected. If the detector 605 detects the disconnection of the communication link, a timer 609 starts its operation. The timer 609 is set depending on the valid period timer value for the STID. If the timer 609 expires, a list manager 607 deletes the STID from its own list in which it records assigned STIDs.

Even if the detector 605 detects an STID which is returned from the MS or other BSs, the list manager 607 deletes the returned STID from its own list.

The receiver 611 receives a handover request and MSID information for another BS from the MS. The assigner 603 assigns its BS prefix and STID, and the transmitter 601 transmits the BS prefix and STID assigned by the assigner 603, and a valid period timer value for the STID.

The detector 605 acquires BS prefix and STID information of another BS by receiving MSID information of another BS from the receiver 611, and detects the BS based on the BS prefix information of another BS. The transmitter 601 returns the STID to the detected BS.

As is apparent from the foregoing description, the disclosed exemplary embodiments of the present invention may perform D2D communications using device IDs which can guarantee both of the global uniqueness within the system and the security, enabling more effective communications.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for supporting device-to-device (D2D) communications by a mobile station (MS) in a communication system, the method comprising:
    performing a network entry procedure with a base station (BS) and receiving, from the BS, a BS prefix, a temporary identifier (ID), and a valid period timer value for the temporary ID;
    generating a device ID based on the BS prefix and the temporary ID; and
    performing, upon detecting data to be transmitted, communication with a peer MS based on the device ID for a time indicated by the valid period timer value,
    wherein the BS prefix is information unique within the communication system, and the temporary ID is information unique within a coverage area of the BS.

2. The method of claim 1, further comprising:
    upon request for handover from the BS to a neighbor BS, transmitting the device ID to the neighbor BS;
    receiving, from the neighbor BS, a neighbor BS's prefix, a neighbor BS's temporary ID, and a valid period timer value for the neighbor BS's temporary ID;
    generating a new device ID based on the neighbor BS's prefix and the neighbor BS's temporary ID; and
    performing, upon detecting data to be transmitted, communication with a peer MS based on the new device ID for a time indicated by the valid period timer value for the neighbor BS's temporary ID.

3. The method of claim 1, further comprising:
    returning the temporary ID to the BS, upon request for handover from the BS to a neighbor BS;
    receiving, from the neighbor BS, a neighbor BS's prefix, a neighbor BS's temporary ID, and a valid period timer value for the neighbor BS's temporary ID;
    generating a new device ID based on the neighbor BS's prefix and the neighbor BS's temporary ID; and
    performing, upon detecting data to be transmitted, communication with a peer MS based on the new device ID for a time indicated by the valid period timer value for the neighbor BS's temporary ID.

4. The method of claim 1, further comprising:
    performing a network reentry procedure with the BS, and receiving, from the BS, a new temporary ID generated by the network reentry and a valid period timer value for the new temporary ID;
    generating a new device ID based on the BS prefix and the new temporary ID; and
    performing, upon detecting data to be transmitted, communication with a peer MS based on the new device ID for a time indicated by the valid period timer value for the new temporary ID.

5. A method for supporting device-to-device (D2D) communications by a base station (BS) in a communication system, the method comprising:
    performing a network entry procedure with a mobile station (MS) and transmitting, to the MS, a BS prefix, a temporary identifier (ID), and a valid period timer value for the temporary ID;
    upon detecting disconnection of a communication link to the MS, starting operation of a timer which is set based on the valid period timer value; and
    deleting, upon expiration of the timer, the temporary ID from a list in which the BS records temporary IDs assigned to the MS,
    wherein the BS prefix is information unique within the communication system, and the temporary ID is information unique within a coverage area of the BS.

6. The method of claim 5, further comprising:
    receiving the temporary ID which is returned from the MS or a neighbor BS; and
    deleting the returned temporary ID from a list in which the BS records temporary IDs assigned to the MS.

7. The method of claim 5, further comprising:
    performing a network reentry procedure with the MS, and transmitting, to the MS, a new temporary ID and a valid period timer value for the new temporary ID;
    upon detecting disconnection of a communication link to the MS, starting operation of a timer which is set depending on the valid period timer value for the new temporary ID; and
    deleting, upon expiration of the timer, the new temporary ID from the list in which the BS records temporary IDs assigned to the MS.

8. A method for supporting device-to-device (D2D) communications by a base station (BS) in a communication system, the method comprising:
    receiving, from a mobile station (MS), a device identifier (ID) including a serving BS's prefix and a serving BS's temporary ID;

transmitting, to the MS, a target BS's prefix, a target BS's temporary ID, and a valid period timer value for the target BS's temporary ID; and returning the serving BS's temporary ID to the serving BS which is detected from the serving BS's prefix, wherein the serving BS's prefix and the target BS's prefix are information unique within the communication system, the serving BS's temporary ID is information unique within a coverage area of the serving BS, and the target BS's temporary ID is information unique within a coverage area of the target BS.

9. A mobile station (MS) apparatus for supporting device-to-device (D2D) communications in a communication system, the method comprising:
a receiver configured to:
perform a network entry procedure with a base station (BS), and
receive, from the BS, a BS prefix, a temporary identifier (ID), and a valid period timer value for the temporary ID;
a generator configured to generate a device ID based on the BS prefix and the temporary ID;
a detector configured to detect data to be transmitted; and
a transmitter configured to perform communication with a peer MS based on the device ID for a time indicated by the valid period timer value, if the detector detects data to be transmitted,
wherein the BS prefix is information unique within the communication system, and the temporary ID is information unique within a coverage area of the BS.

10. The MS apparatus of claim 9,
wherein, if the detector detects a request for handover from the BS to a neighbor BS, the transmitter is further configured to transmit the device ID to the neighbor BS,
wherein the receiver is further configured to receive, from the neighbor BS, a neighbor BS's prefix, a neighbor BS's temporary ID, and a valid period timer value for the neighbor BS's temporary ID,
wherein the generator is further configured to generate a new device ID based on the neighbor BS's prefix and the neighbor BS's temporary ID, and
wherein, if the detector detects data to be transmitted, the transmitter and the receiver are further configured to perform communication with a peer MS based on the new device ID for a time indicated by the valid period timer value for the neighbor BS's temporary ID.

11. The MS apparatus of claim 9,
wherein, if the detector detects a request for handover from the BS to a neighbor BS, the receiver is further configured to receive, from the neighbor BS, a neighbor BS's prefix, a neighbor BS's temporary ID, and a valid period timer value for the neighbor BS's temporary ID,
wherein the generator is further configured to generate a new device ID based on the neighbor BS's prefix and the neighbor BS's temporary ID, and
wherein, if the detector detects data to be transmitted, the transmitter and the receiver are further configured to perform communication with a peer MS based on the new device ID for a time indicated by the valid period timer value for the neighbor BS's temporary ID.

12. The MS apparatus of claim 9,
wherein the receiver is further configured to:
perform a network reentry procedure with the BS, and
receive, from the BS, a new temporary ID generated by the network reentry and a valid period timer value for the new temporary ID,
wherein the generator is further configured to generate a new device ID based on the BS prefix and the new temporary ID, and wherein, if the detector detects data to be transmitted, the transmitter and the receiver are further configured to perform communication with a peer MS based on the new device ID for a time indicated by the valid period timer value for the new temporary ID.

13. A base station (BS) apparatus for supporting device-to-device (D2D) communications in a communication system, the apparatus comprising:
a transmitter configured to:
perform a network entry procedure with a mobile station (MS), and
transmit, to the MS, a BS prefix, a temporary identifier (ID), and a valid period timer value for the temporary ID;
a detector configured to detect disconnection of a communication link to the MS;
a timer configured to:
set a timer value based on the valid period timer value, and
start operation thereof, if the detector detects the disconnection of a communication link to the MS; and
a list manager configured to delete, upon expiration of the timer, the temporary ID from a list in which the BS records temporary IDs assigned to the MS,
wherein the BS prefix is information unique within the communication system, and the temporary ID is information unique within a coverage area of the BS.

14. The BS apparatus of claim 13,
wherein the receiver is further configured to receive the temporary ID which is returned from the MS or a neighbor BS, and
wherein the list manager is further configured to delete the returned temporary ID from the list in which the BS records temporary IDs assigned to the MS.

15. The BS apparatus of claim 13,
wherein the transmitter is further configured to:
perform a network reentry procedure with the MS, and
transmit a new temporary ID and a valid period timer value for the new temporary ID, to the MS,
wherein the timer is further configured to:
set a timer value depending on the valid period timer value for the new temporary ID, and
start operation thereof, if the detector detects the disconnection of a communication link to the MS, and
wherein, if the timer expires, the list manager is further configured to delete the new temporary ID from the list in which the BS records temporary IDs assigned to the MS.

16. A base station (BS) apparatus for supporting device-to-device (D2D) communications in a communication system, the apparatus comprising:
a receiver configured to receive, from a mobile station (MS), a device identifier (ID) including a serving BS's prefix and a serving BS's temporary ID; and
a transmitter configured to:
transmit, to the MS, a target BS's prefix, a target BS's temporary ID, and a valid period timer value for the target BS's temporary ID, and
return the serving BS's temporary ID to the serving BS which is detected from the serving BS's prefix,
wherein the serving BS's prefix and the target BS's prefix are information unique within the communication system, the serving BS's temporary ID is information unique within a coverage area of the serving BS, and the target BS's temporary ID is information unique within a coverage area of the target BS.

* * * * *